United States Patent [19]

Mottate

[11] Patent Number: 4,582,371
[45] Date of Patent: Apr. 15, 1986

[54] BALL-CIRCULATED BALL BEARING ASSEMBLY

[75] Inventor: Tatsuo Mottate, Mitaka, Japan

[73] Assignee: Nippon Thompson Co., Ltd., Tokyo, Japan

[21] Appl. No.: 731,653

[22] Filed: May 7, 1985

[51] Int. Cl.⁴ .............................................. F16C 29/06
[52] U.S. Cl. ...................................................... 308/6 C
[58] Field of Search ...................... 308/6 C, 6 R, 6 A; 464/168

[56] References Cited

U.S. PATENT DOCUMENTS

| | | | |
|---|---|---|---|
| 3,920,289 | 11/1975 | Demay | 308/6 C |
| 4,296,974 | 10/1981 | Teramachi | 308/6 C |
| 4,396,235 | 8/1983 | Teramachi | 308/6 C |
| 4,505,521 | 3/1985 | Teramachi | 308/6 C |

*Primary Examiner*—Lenard A. Footland
*Attorney, Agent, or Firm*—Alan H. MacPherson; Steven F. Caserza; Richard Franklin

[57] ABSTRACT

A ball-circulated ball bearing assembly for infinite linear motion includes a track or guide rail extending straight and provided with a pair of guide grooves and a table sub-assembly which is provided with a pair of endless circulating paths, along each of which a plurality of balls are moved in circulation, thereby allowing the table sub-assembly to move along the guide rail however long it may be. In the preferred embodiment, the table sub-assembly includes a table, a three-part block member defining part of the endless circulating path, a retainer for retaining the block member to the table and a plurality of balls located in the endless circulating path. The retainer is preferably comprised of a shaped plate having a generally U-shaped cross section and having a pair of inwardly curved top edges which come into engagement with the table when assembled to keep the entire table sub-assembly resiliently integrated.

10 Claims, 14 Drawing Figures

BALL-CIRCULATED BALL BEARING ASSEMBLY

BACKGROUND OF THE INVENTION

1. Field of the Invention

This invention generally relates to a ball bearing assembly, and, in particular, to a linear motion ball-circulated ball bearing assembly in which balls are moved along a predetermined circulation path defined between a moving member and an elongated guide member thereby allowing to provide a relative motion between the moving and guide members without restraint.

2. Description of the Prior Art

A ball bearing assembly for infinite linear motion is well known in the art and a typical example of such prior art bearing assembly is described in Japanese Utility Model Post-examination Pub. No. 54-34093. Such a prior art ball bearing assembly is often used for providing a sliding motion to the drawers of a cabinet in which high accuracy is not required. However, with the advent of numerous office automation machines and equipment, it is now required to provide a bearing assembly compact in size, light in weight, and yet high in accuracy, e.g., straightness in linear motion. The prior art bearing assembly as exemplified above cannot satisfy such requirements, and, thus, there is a need to develop a new and improved bearing assembly.

SUMMARY OF THE INVENTION

It is therefore a primary object of the present invention to obviate the disadvantages of the prior art as described above and to provide an improved ball bearing assembly.

Another object of the present invention is to provide an improved ball-circulated ball bearing assembly for infinite linear motion compact in size, light in weight and high in accuracy and structural integrity.

A further object of the present invention is to provide an improved ball-circulated ball bearing assembly which is simple in structure, easy and thus inexpensive to manufacture.

Other objects, advantages and novel features of the present invention will become apparent from the following detailed description of the invention when considered in conjunction with the accompanying drawings.

BRIEF DESCRIPTION OF THE DRAWINGS

FIGS. 6b and 6c are partial cross-sectional views taken along lines B—B and C—C indicated in FIG. 6a, which are useful for explaining the ball guiding function of the retainer shown in FIG. 6a;

DESCRIPTION OF THE PREFERRED EMBODIMENTS

Figure 1:
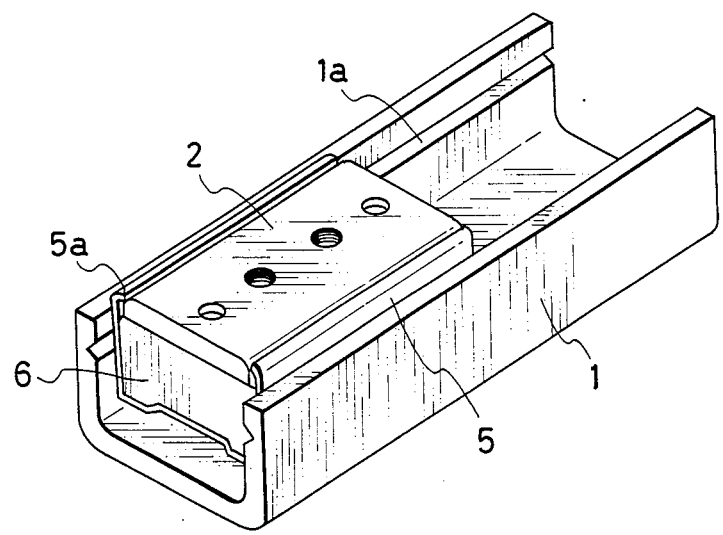
FIG. 1 is a perspective view showing a ball-circulated ball bearing assembly constructed in accordance with one embodiment of the present invention.

Referring now to the drawings, there is shown an infinite linear motion ball bearing assembly constructed in accordance with one embodiment of the present invention. As shown, there is provided an elongated track rail 1 which extends straight over a predetermined distance and which has a generally U-shaped cross section in the transverse direction. Thus, the track rail 1 comprises a flat, bottom section and a pair of side wall sections which extend upright from the sides of the flat, bottom section. The track rail 1 is provided with a pair of straight guide grooves 1a, 1a at the respective inner surfaces of the side wall sections as extending straight in the longitudinal direction. The guide grooves 1a, 1a are preferably V-shaped.

Figure 2:
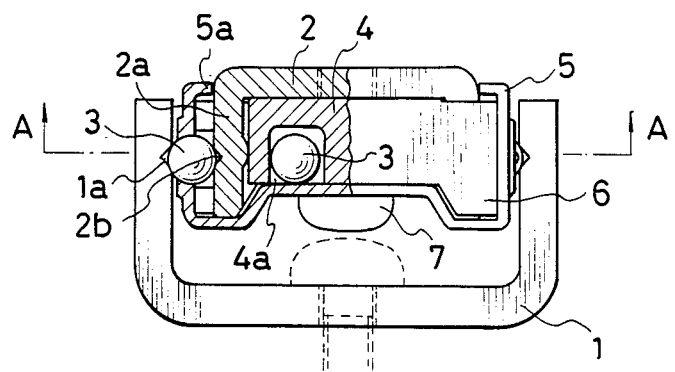
FIG. 2 is a partially sectional, front view of the ball bearing assembly shown in FIG. 1.
Figure 3:
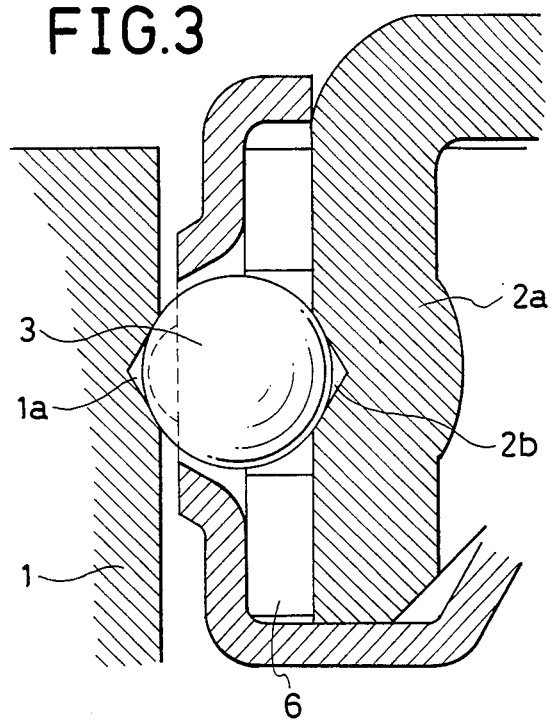
FIG. 3 is a fragmentary, enlarged view showing part of the structure shown in FIG. 2.
Figure 4:
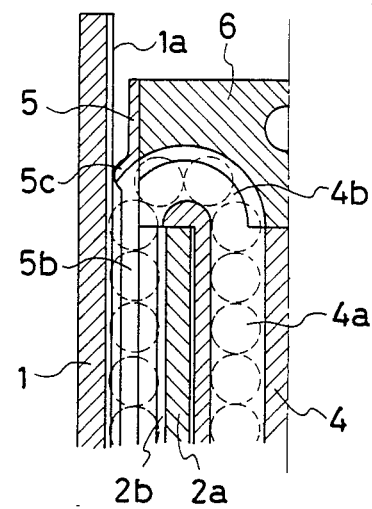
FIG. 4 is a partial cross-sectional view taken along line A—A indicated in FIG. 2.
Figure 5:
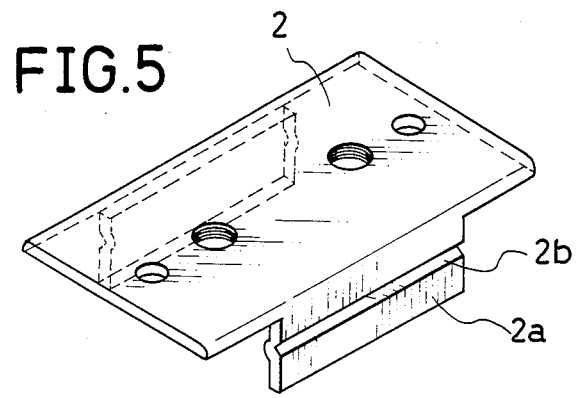
FIG. 5 is a perspective view showing a table forming part of the ball bearing assembly shown in FIG. 1.

Also provided is a moving table 2 which moves along the track rail 1 and which also has a generally U-shaped cross section in the transverse direction at least a part thereof, as best shown in FIG. 5. That is, the table 2 has a flat top section and a pair of side wall sections 2a, 2a which depend from the sides of and are shorter in length than the top flat section. Each of the side wall sections 2a, 2a is provided with a V-shaped guide groove 2b at its outer surface and thus the guide groove 2b is located opposite to the corresponding guide groove 1a when the moving table 2 is located in position. As best shown in FIG. 2, a plurality of balls 3 is provided as partly interposed between the guide grooves 1a and 2b, and, as will be described more in detail, it is so structured that these balls 3 move along an endless or circulating path defined around the side wall section 2a. With this structure, the table 2, in principle, can move along the track rail 1 indefinitely as long as the rail 1 exists.

The ball circulating path is defined around each of the pair of side wall sections 2a and 2a of the moving table 2 and it includes a load region which is straight and defined between the side wall section 2a and the side wall of the track rail 1, a return region which is straight and extends in parallel with the load region for causing the balls 3 to be returned to the load region, and a pair of curved connection regions each provided to connect the corresponding ends of the load and return regions, thereby defining an endless path. It will thus be understood that the balls 3 residing in the load region defined between the guide grooves 1a and 2b rotate along the guide grooves 1a and 2b to produce a relative motion between the table 2 and the track rail 1, and then the balls 3, after passing through one of the curved connection regions, the return region and the other of the curved connection regions, again enter into the load region.

Figure 8A:
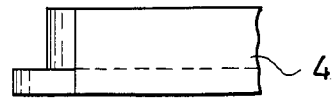
FIGS. 8a through 8c are side-elevational, bottom-plan and perspective views, respectively, showing a portion of the center block forming part of the ball bearing assembly shown in FIG. 1.
Figure 8B:
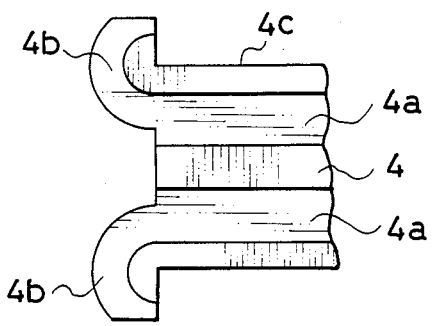
Figure 8C:
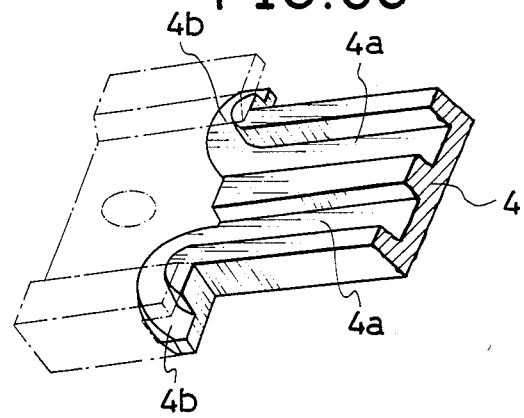

As described above, the load region of the ball circulating path is defined between the opposed guide grooves 1a and 2b. In order to define the rest of the ball circulating path, i.e., the pair of curved connection regions and the return region, there are provided a center block 4 and a pair of end blocks 6, 6 each disposed at one end of the center block 4. As shown in FIG. 2, the center block 4 is provided as embraced by and fixedly attached to the table 2, and the structure of the approximate left-half section of center block 4 is shown in FIGS. 8a through 8c. The center block 4 is comprised of a plate generally having the shape of letter "X". The center block 4 is provided with a pair of straight grooves 4a, 4a in one surface extending in parallel. These straight grooves 4a, 4a define the return regions of the respective ball circulating path described above and they may take any appropriate cross sectional shape, though they are shown to be rectangular or U-shaped in the illustrated embodiment. The center block 4 is also provided with a curved section 4b at each corner as best shown in FIG. 8b. The curved section 4b is partly cut-away to define the above-described curved connection region which is continuously in communication with the corresponding end of the groove 4a defining the return region. The provision of curved section 4b at each of the four corners gives an impression that the center block 4 is generally X-shaped. The center block constructed as described above is fixedly attached to the table 2 as located between the side wall sections 2a, 2a with the surface having the pair of grooves 4a, 4a exposed.

Figure 7A:
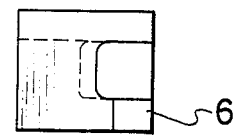
FIGS. 7a through 7c are side-elevational, bottom-plan and perspective views, respectively, showing an end block forming part of the ball bearing assembly shown in FIG. 1.
Figure 7B:
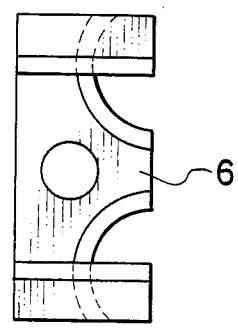
Figure 7C:
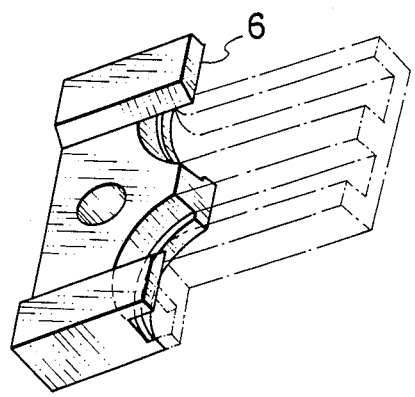

Also provided is an end block 6 which is to be disposed contiguous to the corresponding end of the center block 4 as best shown in FIG. 8c. The end block 6 has a structure as illustrated in FIGS. 7a through 7c, and it has a pair of curved side walls each of which defines part of the above-described curved connection region when assembled with the center block 4. Thus, when the pair of end blocks 6, 6 is placed adjacent to the corresponding ends of the center block 4, there is defined part of the endless circulating path, comprised of the return region and pair of curved connection regions each continuously connected at each end of the return region. It is to be noted that a combination of the center block 4 having the pair of end blocks 6, 6 each located adjacent to the corresponding end of the center block 4 is placed in contact with the bottom surface of the flat top section of the table 2 as embraced between the pair of side wall sections 2a, 2a.

Figure 6A:
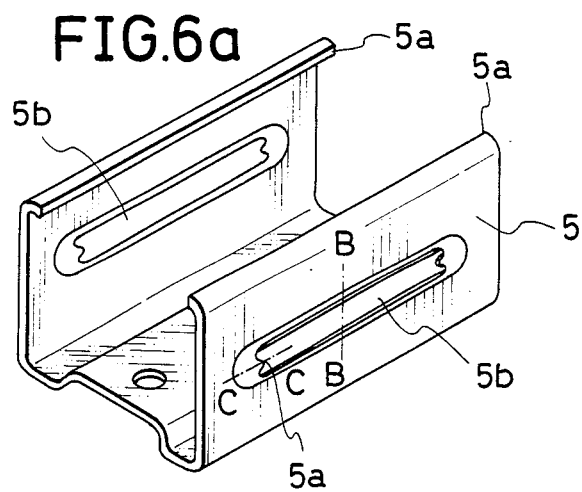
FIG. 6a is a perspective view showing a retainer forming part of the ball bearing assembly shown in FIG. 1.

The present ball bearing assembly also includes a retainer 5, as best shown in FIG. 6a, which partly serves to retain the combination of the center and end blocks 4 and 6 in position and which partly serves to guide the balls 3 to properly move into, along and out of the load region of the above-described ball circulating path. The retainer 5 of the illustrated embodiment has a generally U-shaped cross section and it is elongated along the longitudinal direction thereby defining the longitudinal length of the present ball bearing assembly. The retainer 5 shown is made by bending a thin steel plate generally in the shape of "U", and, thus, the retainer 5, in general, includes a bottom section and a pair of side wall sections which extend upright from respective sides of the bottom section. It is to be noted that the retainer 5 may be made from any material but it must provide a required resiliency as will be described later. However, the bottom section of retainer 5 is provided with a raised flat portion which comes into contact with the surface of the center and end blocks 4 and 6, where the grooves 4a and 4b are formed, when the retainer 5 is set in position, thereby closing the grooves 4a and 4b to prevent the balls 3 from falling out. This condition is best illustrated in FIG. 2.

Figures 6B, 6C:
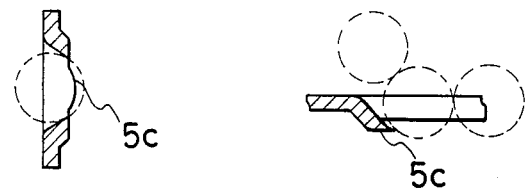

Each of the side wall sections of retainer 5 is provided with an inwardly curved edge 5a at its top. It is to be noted that the curved edge 5a comes into engagement with the corresponding shoulder region of the table 2 which is generally defined as a region between the top flat section and the side wall section 2a of table 2 when set in position as shown in FIG. 2. Because of its resiliency, the retainer 5 becomes clamped to the table 2 when its curved edges 5a, 5a are brought into engagement with the corresponding shoulder regions. of the the retainer 5 so clamped, the combination of center and end blocks 4 and 6 are maintained in position as shown in FIG. 2. It should be appreciated that such a structure is particularly advantageous in assembling the present apparatus. The side wall section of retainer 5 is also provided with an elongated window 5b as extending in the longitudinal direction. The elongated window 5b has a width which is slightly smaller than the diameter of the balls 3, as shown in FIG. 6b, and thus the window 5b serves to guide the movement of the balls 3 along the load region of ball circulating path. There is also provided a guide tongue 5c at each end of the window 5b, which contributes to guide the balls 3 to smoothly move into or out of the load region of ball circulating path. The guiding function provided by the guide tongue 5c is best illustrated in FIG. 6c.

In the illustrated embodiment, an inwardly projecting ridge is formed at the inner surface of each of the side wall sections of table 2, so that when the center block 4 is placed into contact with the bottom surface of the top flat section of table 2, its side walls 4c (not shown) come into pressure contact with the corresponding ridges, and, therefore, the center block 4 may be held in position as pressed by the side wall sections 2a, 2a from both sides. However, in order to secure the structural integrity, it is preferable to use a screw 7 (see FIG. 2) to securely hold the table 2, center block 4 and retainer 5 together. Furthermore, in the illustrated embodiment, use is also made of a screw to have the end block 6 fixedly attached to the table 2 to obtain an increased structural integrity. However, alternatively, an engaging structure may be provided between the end block 6 and the table 2 or the center block 4 to have the end block held in position by the retainer 5 as is obvious for those skilled in the art.

The center and end blocks 4 and 6 are preferably manufactured from resin materials, such as plastics, by injection molding or precision casting, and they may be formed as a unit, if desired.

In accordance with the present invention, even if the track rail 1 and the table 2 are comprised of a thin steel plate having the thickness in the order of 1–2 mm, there may be provided a ball bearing assembly which is sturdy in structure and high in accuracy. That is, even if the track rail 1 and/or the table 2 slightly deforms, due, for example, to the application of external forces, the ball circulating paths may also deform desirably thereby allowing the balls 3 to move smoothly at all times because the entire structure is held together resiliently.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A ball bearing assembly comprising:
a guide rail having at least one first guide groove;

a table;

means for defining part of an endless circulating path including a load region, a return region and a pair of curved connection regions each connecting the corresponding ends of said load and return regions, at least said load region being located outside of said means for defining and between said guide rail and said table;

retaining means for resiliently retaining said means for defining to said table; and a plurality of balls located in said endless circulating path so as to be movable along said path thereby allowing said table to move along said guide rail.

2. The assembly of claim 1 wherein said guide rail is elongated and has a generally U-shaped cross section, whereby a pair of said first guide grooves is provided opposed to each other in said guide rail, and said table is provided with a flat top section and a pair of side wall sections which depend from the sides of said flat top section, each of said side wall sections being provided with a second guide groove at its outer surface, which is opposite to the corresponding one of said pair of first guide grooves in said guide rail to define said load region of an endless circulating path.

3. The assembly of claim 2 wherein said means for defining includes a block member provided with a pair of third guide grooves defining said return and curved connection regions.

4. The assembly of claim 3 wherein said block member is comprised of a center block and a pair of end blocks each disposed at an end of said center block.

5. The assembly of claim 3 wherein said retaining means includes a shaped plate having a generally U-shaped cross section and a pair of inwardly curved top ends which come into engagement with said table to retain said block member in position.

6. The assembly of claim 5 wherein said shaped plate is comprised of a thin steel plate.

7. The assembly of claim 5 wherein said shaped plate is provided with an elongated window extending along said load region, said window having a width slightly smaller than the diameter of said plurality of balls thereby contributing to guide the movement of said plurality of balls along said load region.

8. The assembly of claim 7 wherein said shaped plate is provided with a guide tongue at each end of said window so as to allow said plurality of balls to move into and out of said load region smoothly.

9. The assembly of claim 5 wherein said shaped plate is provided with a raised bottom section which comes into contact with said block member when assembled thereby closing said grooves formed in said block member.

10. The assembly of claim 3 wherein each of said pair of side wall sections of said table is provided with an inwardly projecting ridge at its inner surface so that said block member is brought into pressure contact with said ridge when located in position.

* * * * *